United States Patent [19]
Tabuchi

[11] Patent Number: 5,420,960
[45] Date of Patent: May 30, 1995

[54] MOTOR CONTROL SYSTEM

[75] Inventor: Junichiro Tabuchi, Tondabayashi, Japan

[73] Assignee: Sanyo Electric Co., Ltd., Osaka, Japan

[21] Appl. No.: 127,552

[22] Filed: Sep. 28, 1993

[30] Foreign Application Priority Data

Sep. 30, 1992 [JP] Japan .................................. 4-262235
Oct. 30, 1992 [JP] Japan .................................. 4-292733

[51] Int. Cl.$^6$ .............................................. H02P 5/00
[52] U.S. Cl. .................................. 388/800; 388/805; 388/814; 388/907.5
[58] Field of Search ............ 385/800, 805, 814, 907.5, 385/820

[56] References Cited

U.S. PATENT DOCUMENTS 5,019,958  5/1991  Varga et al. .

FOREIGN PATENT DOCUMENTS 0280931  9/1988  European Pat. Off. .
0448136  9/1991  European Pat. Off. .

*Primary Examiner*—William M. Shoop, Jr.
*Assistant Examiner*—Karen Masih
*Attorney, Agent, or Firm*—Armstrong, Westerman, Hattori, McLeland & Naughton

[57] ABSTRACT

A motor control system includes a microcomputer for executing a so-called software servo-control, and the microcomputer receives a speed signal and a phase signal from the motor. In the microcomputer, speed error data is evaluated on the basis of the speed signal, and speed integration data is evaluated on the basis of the speed error data and a first reference signal, and phase integration data is evaluated on the basis of the phase signal and a second reference signal. The speed error data, the speed integration data and the phase integration data is synthesized, so as to obtain motor control data.

7 Claims, 9 Drawing Sheets

FG SIGNAL

FRC

SPEED ERROR DATA

F I G. 3A
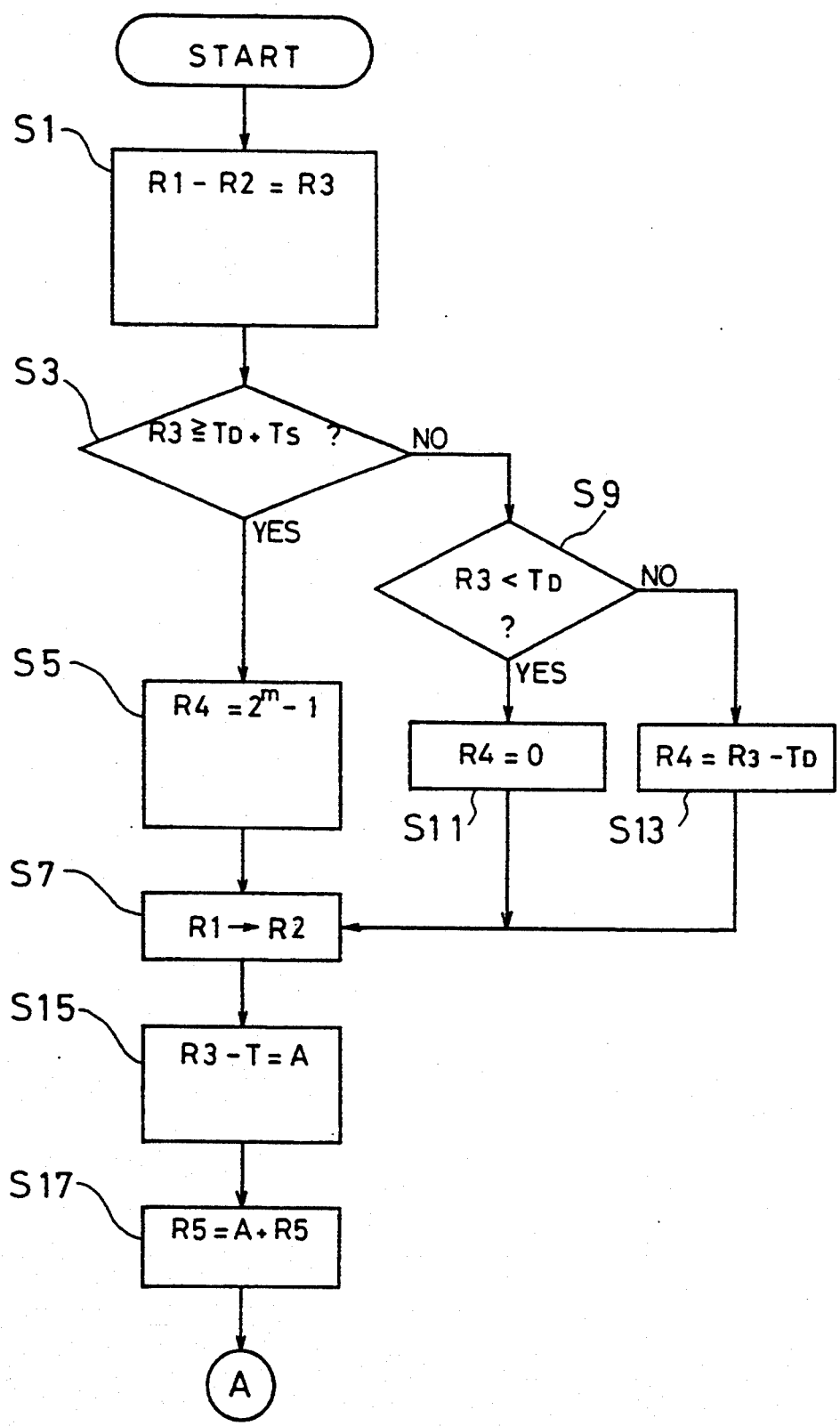

MOTOR CONTROL SYSTEM

BACKGROUND OF THE INVENTION

1. Field of the Invention

The present invention relates to a motor control system. More specifically, the present invention relates to a motor control system which is utilized for controlling a drum motor and a capstan motor of a VTR, for example.

2. Description of the Prior Art

With referring to FIG. 9, in a conventional motor control system 1, speed error data is outputted by a speed detection portion 3 on the basis of a speed signal (FG signal) from a motor 2, and phase error data is outputted by a phase detection portion 4 on the basis of a phase signal (PG signal) from the motor 2 and a vertical synchronization signal (Vsync). Then, the speed error data and the phase error data are synthesized with each other, and a synthesized result is inputted to a driver 6 via a filter 5, such that the motor 2 is driven by the driver 6.

With referring to FIG. 10, in another conventional motor control system 1', the speed error data is outputted by the speed detection portion 3 on the basis of the FG signal, and speed integration data is outputted by a speed integration portion 7 by sequentially adding differences between the speed error data and a theoretical FG period data that is applied from an outside. In a reproducing (play) mode, the speed integration data is synthesized with the speed error data, and a synthesized result is given to the driver 6 through the filter 5. In a recording mode, the above described theoretical FG period data and phase difference data between the PG signal that is applied via a switch 8 and the vertical synchronization signal Vsync are synthesized with each other, whereby the phase lock between the vertical synchronization signal Vsync and the PG signal can be established by changing the theoretical FG period data.

In the conventional motor control system 1 shown in FIG. 9, it is impossible to secure a sufficient pull-in range for the phase. In contrast, in the motor control system 1' shown in FIG. 10, the pull-in range can be made broader enough because an integration type phase servo-control is performed; however, in the both prior arts, there was a problem that a sufficient gain can not be secured in a case of a miniaturized motor which is utilized in an 8 mm VTR, for example, as shown by a line B in FIG. 4. In addition, a line C in FIG. 4 is representative of a transfer function of a case where only a speed servo-control is performed.

SUMMARY OF THE INVENTION

Therefore, a principal object of the present invention is to provide a motor control system in which it is possible to make a pull-in range for a phase broader and a servo-gain larger.

Another object of the present invention is to provide a motor control system in which a stable operation can be expected.

A motor control system according to the present invention controls a motor which outputs a speed signal and a phase signal, and comprises: speed detecting means for outputting a speed error signal on the basis of a speed signal; speed integrating means for outputting a speed integration signal on the basis of the speed error signal and a first reference signal; phase integrating means for outputting a phase integration signal on the basis of a phase signal and a second reference signal; and synthesizing means for synthesizing the speed error signal, the speed integration signal and the phase integration signal.

By synthesizing the speed error signal and the speed integration signal with each other, the pull-in range for the phase becomes large enough. Furthermore, the phase integration signal is also synthesized with these signals; however, since a degree of the phase integration signal is higher than a degree of the speed integration signal, a servo-gain becomes large. Then, an output of the synthesizing means is filtered by filter means, and then, subjected to an A/D conversion so as to be applied to the motor as a motor control voltage.

In accordance with the present invention, not only the pull-in range becomes broader but also the servo-gain becomes larger, and therefore, it is possible to expect a servo-control operation more stably in comparison with the prior arts.

In an aspect of the present invention, the motor control system further comprises acceleration detecting means for detecting an acceleration of a rotation of the motor, and a synthesizing ratio in the synthesizing means is controlled according to the acceleration. In this aspect, the synthesizing ratio of the speed and the phase is continuously changed in response to the acceleration. Therefore, if the acceleration is larger, the ratio of the phase is made larger, and accordingly, the pull-in time becomes shorter in a transient state because the ratio of the phase is larger in the transient state, and in a normal state, a stability of the rotation of the motor becomes good because the ratio of the speed is made larger in the normal state.

In another aspect of the present invention, a synthesizing ratio of different degrees of the filter means, a primary filter output and a secondary filter output, for example, is continuously changed according to the acceleration. Therefore, the larger acceleration, the larger ratio of the primary filter output. Accordingly, in a transient state, a transient response becomes stable because the ratio of the primary filter output becomes larger, and in a normal state, a gain of a low-frequency region becomes larger because the ratio of the secondary filter output is made larger.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 3A and 3B are flowcharts showing an operation of FIG. 1 embodiment;

DETAILED DESCRIPTION OF THE PREFERRED EMBODIMENTS

Figure 1:
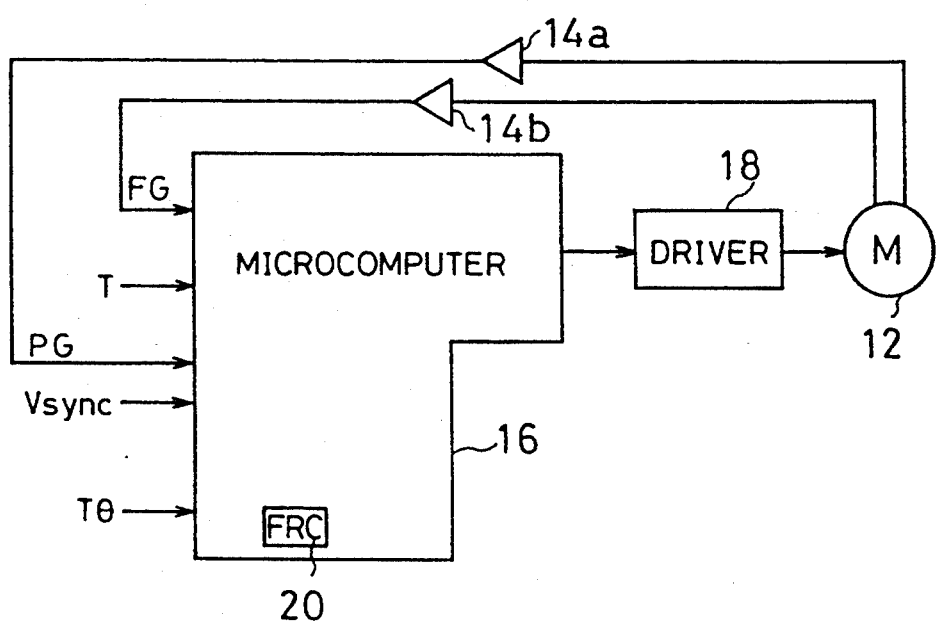
FIG. 1 is a block diagram showing one embodiment according to the present invention.

Referring to FIG. 1, a motor control system 10 of this embodiment shown is a so-called software servo-control system for a drum motor 12. A PG signal and an FG signal are outputted from the drum motor 12, and then, inputted to a microcomputer 16 via amplifiers 14a and 14b. Furthermore, theoretical FG period data T that is an ideal value of an FG period, a vertical synchronization signal Vsync, and theoretical phase error data $T\theta$ that is an ideal value of a phase difference between the vertical synchronization signal Vsync and the PG signal are inputted to the microcomputer 16. The microcomputer 16 executes a so-called software servo-control on the basis of these signals and data so as to apply a driving signal to a driver 18.

Figure 2A:
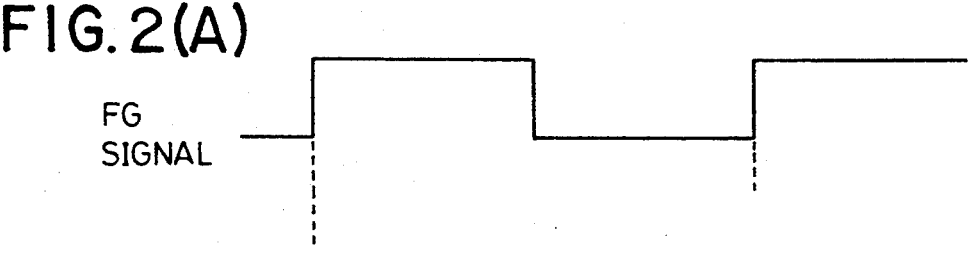
FIG. 2 is a timing chart showing relationship between an FG signal and speed error data in FIG. 1 embodiment.
Figure 2B:
Figure 2C:
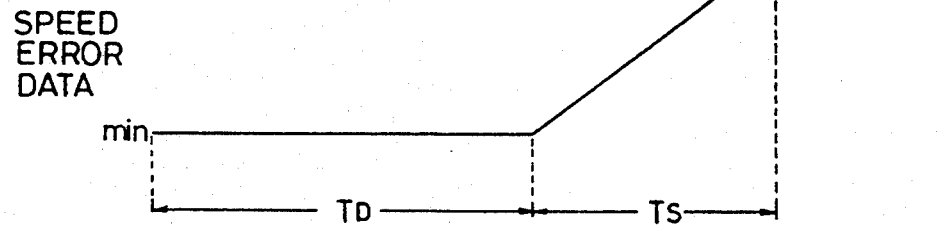

In operation, in a step S1 shown in FIG. 3A, the microcomputer 16 fetches or captures a count value of a free-running counter (hereinafter, called as "FRC": FIG. 1) at every timing of the FG signal shown in FIG. 2(A), and a difference between the present FG capture data (R1) and the last FG capture data (R2) shown in FIG. 2(B) is evaluated, whereby FG period data (R3) is calculated. Next, in a step S3, it is determined whether or not the FG period data (R3) is larger than the speed error data (R4), that is, "$T_D+T_S$" shown in FIG. 2(C). In addition, $T_D$ denotes a delay time, and $T_S$ denotes a lock range, that is, the pull-in range.

In a case of $R3 \geq T_D+T_S$, the speed error data (R4) is set as "$2^m-1$" in a step S5. In addition, "m" denotes an arbitrary integer. Thereafter, in a step S7, the present FG capture data (R1) is set as the last FG capture data (R2).

On the other hand, in a case of $R3 < T_D+T_S$, it is determined whether or not the FG period data (R3) is smaller than the delay time $T_D$ in a step S9. When $R3 < T_D$, the speed error data (R4) is set as "0" (R4=0) in a step S11. When $R3 \geq T_D$, "$R3-T_D$" is set as the speed error data (R4) in a step S13. Thereafter, in the step S7, the present FG capture data (R1) is set as the last FG capture data (R2).

In a step S15 following to the step S7, a difference between the FG period data (R3) and the theoretical FG period data (T) is calculated by an accumulator (not shown), and a result thereof is held by the accumulator (A). Then, in a step S17, a held value (A) and speed integration data (R5) are sequentially added to each other, whereby succeeding speed integration data (R5) can be calculated.

Figure 3B:
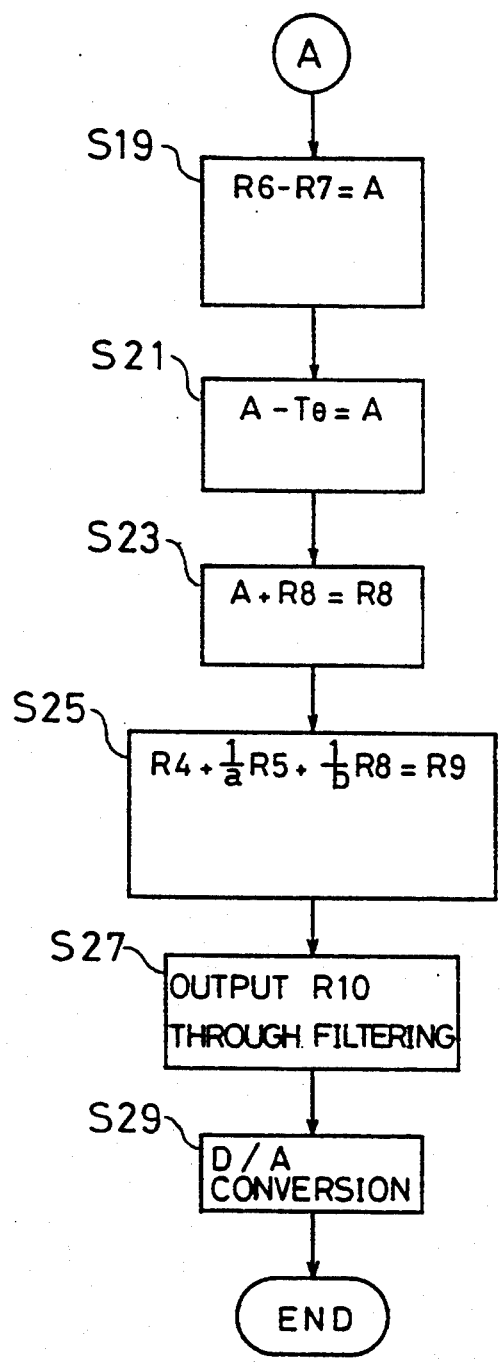

In a succeeding step S19 shown in FIG. 3B, a difference between PG timer data (R6) and Vsync timer data (R7) is calculated by an accumulator (not shown), and a result thereof is held in the accumulator (A). In addition, the PG timer data (R6) and the Vsync timer data (R7) are data of the FRC 20 at a timing that the PG signal is inputted and data of the FRC 20 at a timing that the vertical synchronization signal Vsync is inputted, respectively. In a next step S21, a difference between the value (A) of accumulator and the theoretical phase data $T\theta$ is evaluated, and the difference is held in an accumulator (8). Then, sequential phase integration data (R8) can be evaluated by sequentially adding the value (A) to the phase integration data (R8) in a step S23.

The speed error data (R4), the speed integration data (R5) and the phase integration data (R8) thus calculated in the above described manner are synthesized with each other with a predetermined synthesizing ratio that is represented by $R9=R4+1/a \cdot R5+1/b \cdot R8$ (a: a synthesizing ratio of the speed and the phase, and b: a synthesizing ratio of the speed and the phase integration), whereby synthesized data (R9) can be calculated. Thereafter, the synthesized data (R9) is subjected to a filtering process so as to evaluate output data (R10) in a step S27, and the output data (R10) is subjected to a D/A conversion in a step S29.

Therefore, a motor control signal obtained through the D/A conversion is outputted from the microcomputer 16, and the same is applied to the driver 18, and accordingly, the drum motor 12 is driven by a motor driving voltage from the driver 18.

In the above described embodiment, the speed error data (R4) and the speed integration data (R5) are synthesized with each other in the step S25, the phase servo-control for suppressing a so-called drift is executed. At this time, such the phase servo-control is an integration type phase servo-control, and therefore, it is possible to obtain a pull-in range broader enough.

Figure 4:
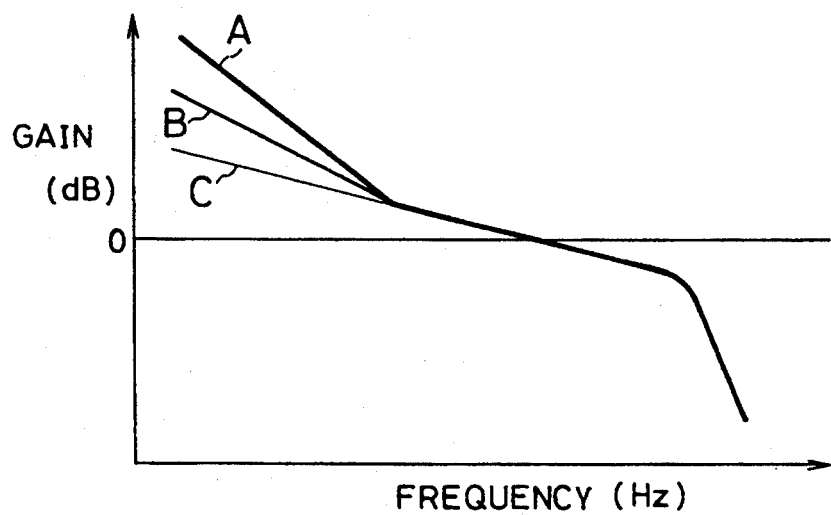
FIG. 4 is a graph showing a transfer function of FIG. 1 embodiment in comparison with the prior art.
Figure 9:
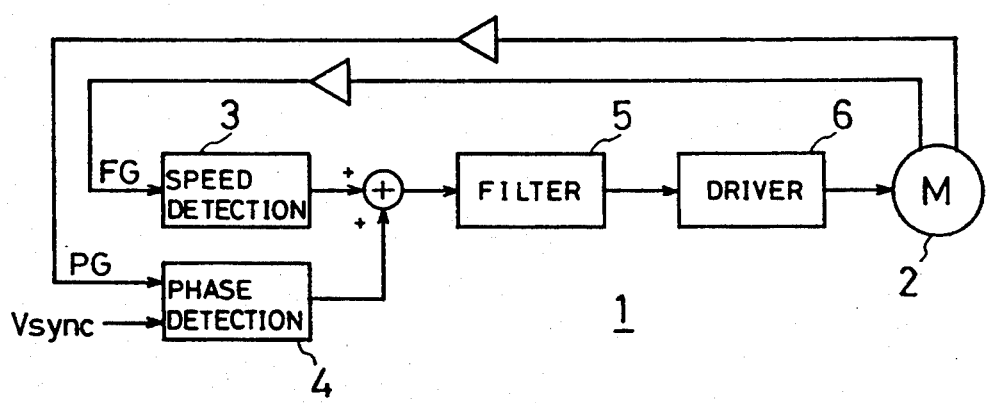
FIG. 9 is a block diagram showing a prior art.

Furthermore, the degree of the phase integration data (R8) becomes higher than the degree of the speed integration data (R5) by one degree, and therefore, by synthesizing the phase integration data (R8) with the above described data in the step S25, the servo-gain for the phase becomes high as shown by a line A in FIG. 4. Therefore, the phase of the drum motor 12 is locked, and thus, a locked point is not changed at a winding start and a winding end of a video tape, and there occurs no change of a lock point according to a rotation period of a reel base.

Figure 5:
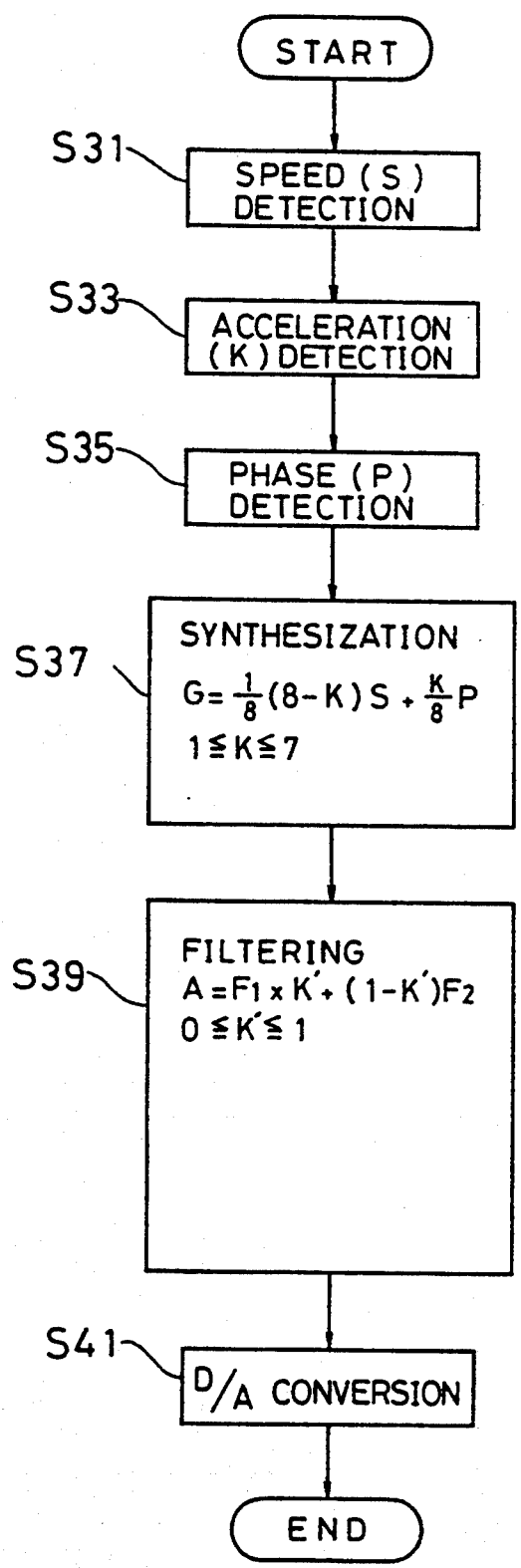
FIG. 5 is a flowchart showing an operation of another embodiment according to the present invention.

In another embodiment according to the present invention shown in FIG. 5, the structure of FIG. 1 block diagram is utilized. FIG. 5 embodiment is an embodiment capable of solving another problem in the prior art. More specifically, in the conventional motor control system, since a synthesizing ratio of the speed and the phase is constant, the pull-in time in a transient state becomes long when the ratio of the speed is larger than the ratio of the phase, and when the ratio of the phase is larger than the ratio of the speed, a stability of the rotation of the motor becomes bad. Furthermore, if the degree of the filter (lag filter) is made constant, the rotation of the motor becomes unstable in the transient state or in a normal state. Even when the degree of the lag filter is changed in the transient state or the normal state, an output signal of the lag filter is suddenly changed at a timing that the degree is changed, the rotation of the motor also becomes unstable.

FIG. 5 embodiment is able to solve such the problems. More specifically, in a first step S31, a rotation speed (S) of the motor 12 is detected on the basis of the FG signal. Next, in a step S33, a period of the FG signal between the last inputted FG signal and the present inputted FG signal is detected, and an acceleration (K) of the rotation of the motor 12 is evaluated on the basis of the FG signal period. Furthermore, in a step S35, a rotation phase (P) of the motor 12 is detected on the basis of the PG signal. The rotation speed (S), the acceleration (K) and the phase (P) are substituted in the following equation (1) in a step S7, and therefore, the rotation speed (S) and the rotation phase (P) are synthesized with each other according to the synthesizing ratio that is determined by the acceleration (K). In addition, in the following equation (1), a maximum value of the acceleration (K) is set as "7" and a minimum value of the same is set as "1" ($1 \geq K \geq 7$).

$$G=(8-K)S/8+KP/8 \quad (1)$$

The synthesized data (G) is succeedingly subjected to a filtering process in a step S9. More specifically, a primary lag filter output (F1) and a secondary lag filter output (F2) can be obtained on the basis of the synthesized data (G), and the same are substituted in the following equation (2). Therefore, the primary lag filter output (F1) and the secondary lag filter output (F2) are synthesized with each other according to a synthesizing ratio that is determined by a value K' ($0 \geq K' \geq 1$) that is obtained through normalization of the acceleration (K).

$$A=F1 \times K'+(1-K') \times F2 \quad (2)$$

The synthesized data (A) is converted into a motor control signal in a step S11 to be outputted from the microcomputer 16. Then, the motor 12 is driven by the driver 18 in accordance with the motor control signal.

The synthesized data (G) at a state where the acceleration (K) is maximum (transient state) becomes to be given by the following equation (3), and the synthesized data (G) at a state where the acceleration (K) is minimum (normal state) becomes to be given by the following equation (4).

$$G=S/8+7P/8 \quad (3)$$

$$G=7S/8+P/8 \quad (4)$$

That is, the larger acceleration, the larger ratio of the phase. Therefore, in the transient state where the acceleration is large, the ratio of the phase becomes large, and therefore, the pull-in time becomes short. Furthermore, the smaller acceleration, the larger ratio of the speed. Therefore, in the normal state where the acceleration is small, the unevenness of the rotation of the motor becomes small, and therefore, the motor is rotated stably.

Furthermore, according to the equation (2), the ratio of the primary lag filter output (F1) becomes large at a state where the acceleration (K') is large (transient state), and the ratio of the secondary lag filter output (F2) becomes large at a state where the acceleration (K') is small (normal state). Thus, by changing the ratio of the degrees of the filter, the motor is operated stably, and the reason will be described with referring to FIG. 6 and FIG. 7.

Figure 6:
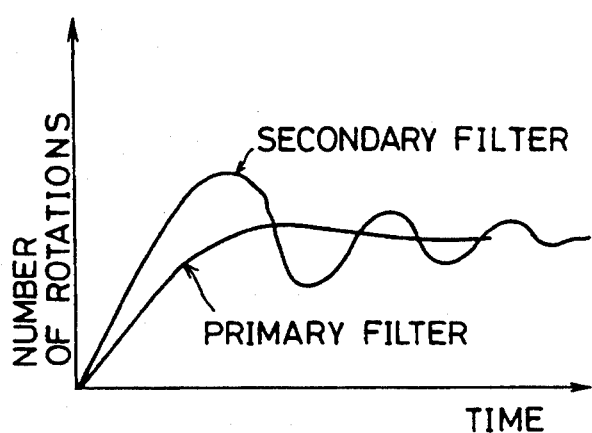
FIG. 6 is a graph showing a transient response characteristic of the number of rotations of a motor.
Figure 7:
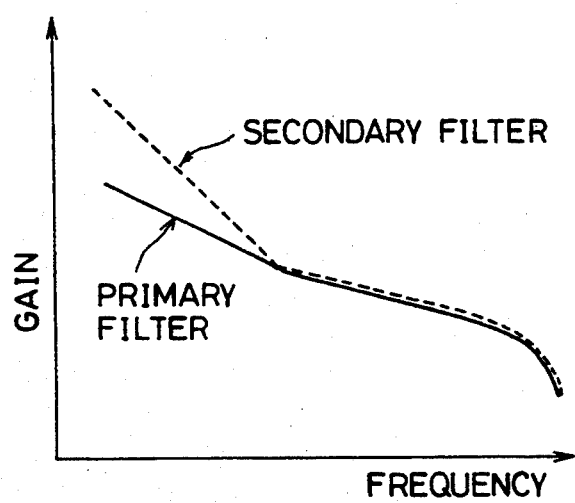
FIG. 7 is a graph showing a frequency characteristic of the servo-gain of the embodiment.

FIG. 6 shows a transient response characteristic of the number of rotations of the motor, and as seen from FIG. 6, the transient response is stable when the ratio of the primary lag filter output is large, and the transient response becomes unstable when the ratio of the secondary lag filter output is large. Furthermore, FIG. 7 shows a frequency characteristic of the servo-gain, and as seen from FIG. 7, the servo-gain in a low frequency region is small when the ratio of the primary lag filter output is larger, but the servo-gain in the low frequency region becomes large as the ratio of the secondary lag filter output becomes larger. Then, in this embodiment shown in FIG. 5, since the ratio of the primary lag filter output and the secondary lag filter output is continuously changed in response to a change of the acceleration, no phenomenon that the rotation of the motor 12 becomes unstable due to occurring of discontinuous points.

In addition, in FIG. 5 embodiment, the synthesization of the speed and the phase, and the synthesization of the degrees of the lag filter are simultaneously performed, it is needless to say that any one of the synthesization may be effectively utilized.

Figure 8A:
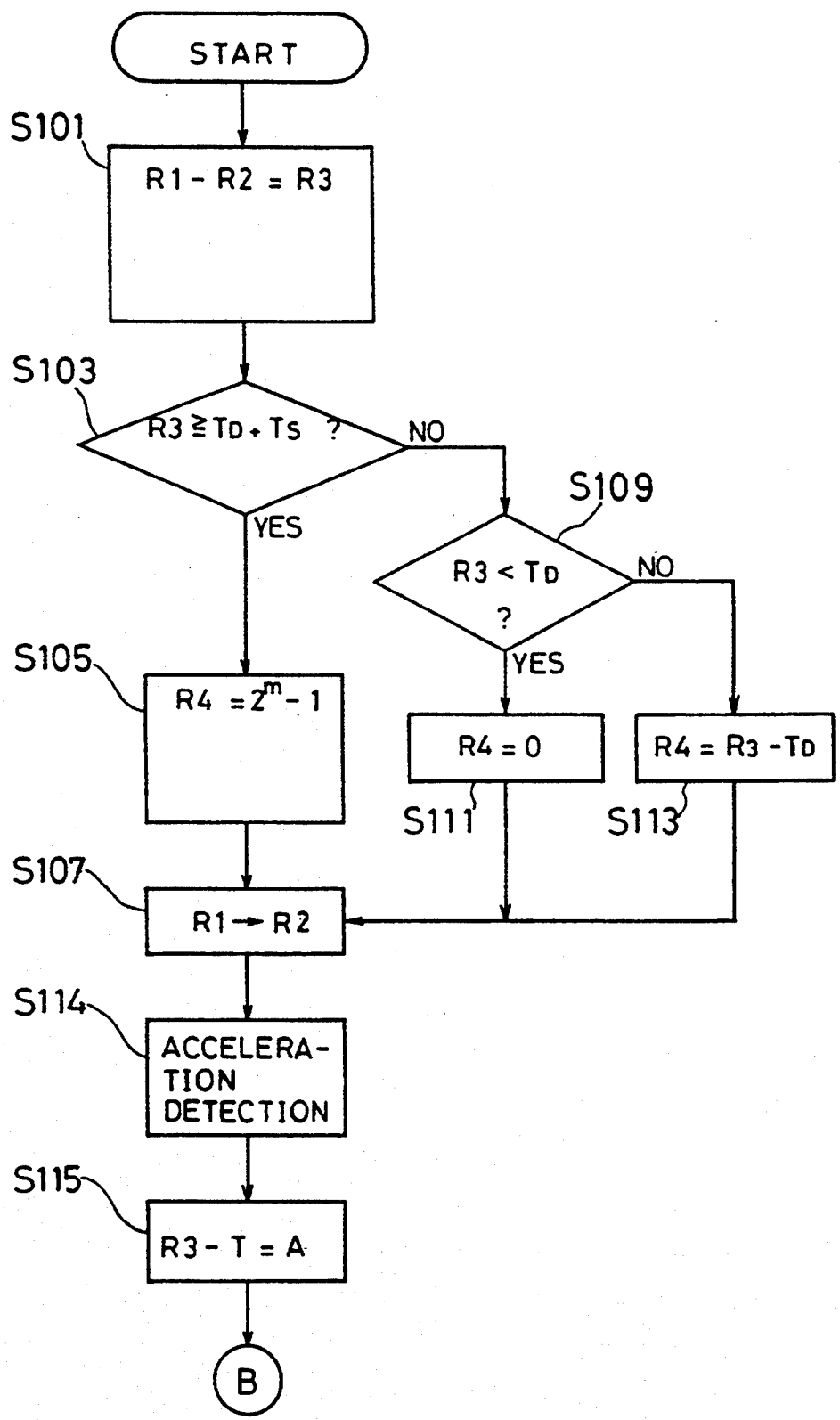
FIG. 8A and 8B are flowcharts showing an operation of another embodiment according to the present invention.
Figure 8B:
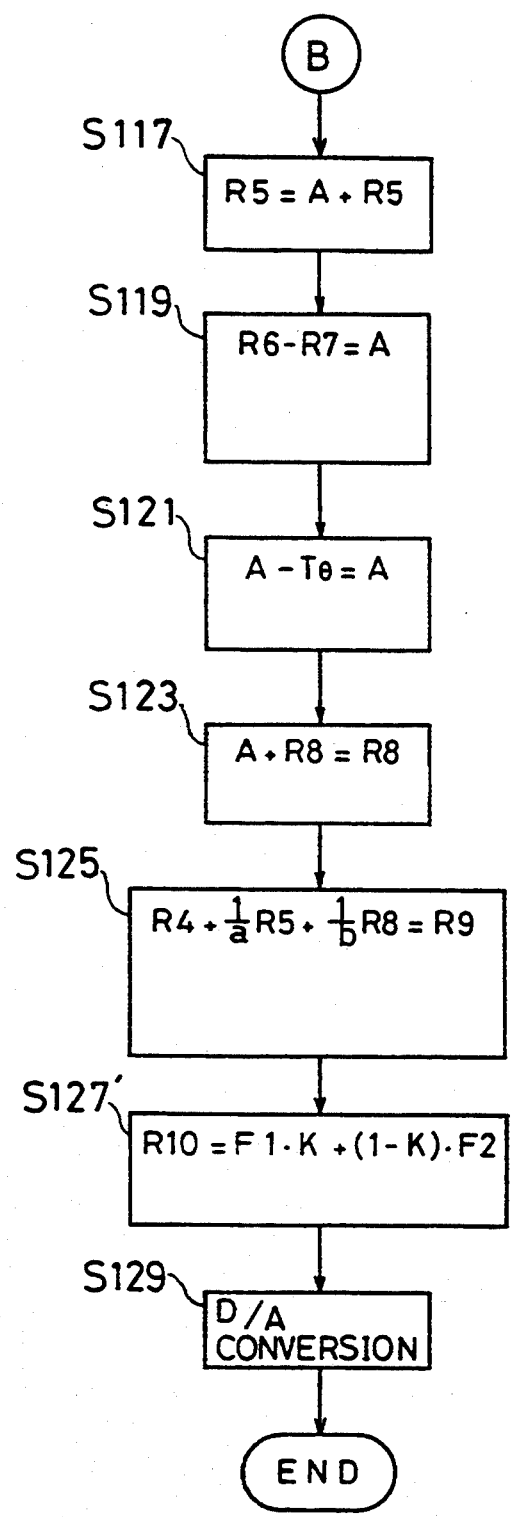
Figure 10:
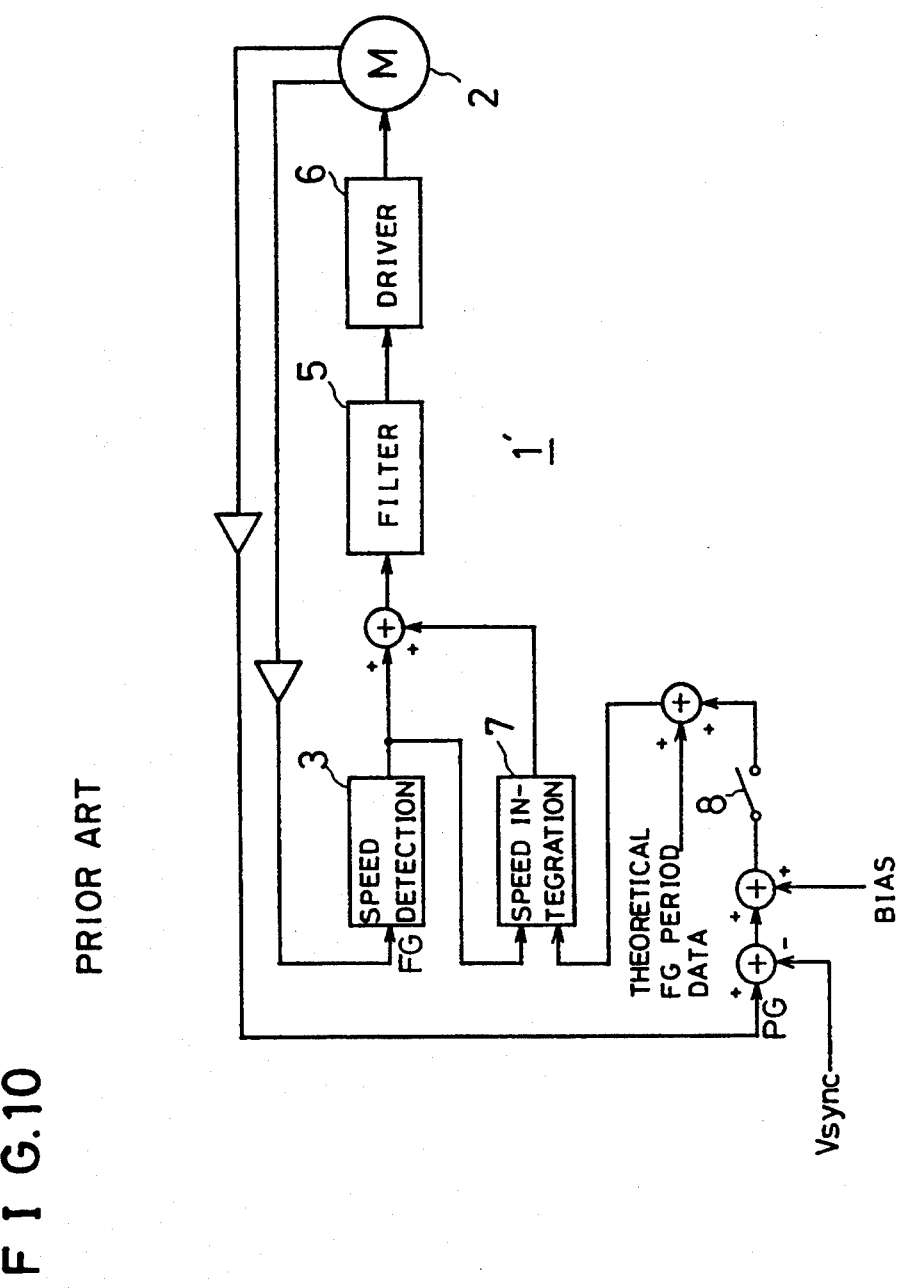
FIG. 10 is a block diagram showing another prior art.

In another embodiment according to the present invention shown in FIG. 8A and FIG. 8B, a first embodiment shown by FIG. 3A and FIG. 3B and second embodiment shown by FIG. 5 are combined with each other. More specifically, a software servo-control routine shown in FIG. 8A and FIG. 8B is an interrupt routine that is executed at every timing of the FG signal from the drum motor 12, as similar to the first embodiment or the second embodiment.

In steps S101–S113 shown in FIG. 8A are executed for detecting the speed (R4: S) as similar to the steps S1–S13 of the first embodiment. However, since the steps S101–S113 are similar to the steps S1–S13 of the first embodiment, a duplicate description will be omitted here.

Then, in a step S114 of FIG. 8A, the acceleration (K) is detected through a method similar to that of the step S33 of the second embodiment.

Thereafter, in steps S115–S123 shown in FIG. 8A and FIG. 8B, an operation for detecting the phase is executed. More specifically, in the steps S115–S123, the phase (R5: P) is detected as similar to the steps S15–S23 of the first embodiment. However, since the steps S115–S123 are similar to the steps S15–S23, a duplicate description will be omitted here.

In a step S125 shown in FIG. 8B, that is the same as the step S25 of the first embodiment, the speed error data and the phase error data are synthesized according to the synthesizing ratios a and b to obtain the synthesized result (R9). Then, in a step S127', the synthesized result (R9) is subjected to the filtering process. More specifically, as similar to the step S127 of the second embodiment, the primary filter output (F1) and the secondary filter output (F2) are synthesized with each other in response to the acceleration (K) evaluated in the previous step S114.

In a third embodiment shown in FIG. 8A and FIG. 8B, since the speed error signal component, the speed integration signal component, and the phase integration signal component are synthesized with each other as similar to the first embodiment, not only the pull-in range becomes broader enough but also the servo-gain becomes large. Furthermore, as similar to the second embodiment, the acceleration is detected and the synthesizing ratio of the primary filter output and the secondary filter output is changed according to the acceleration. Accordingly, in the transient state, the transient response becomes stable because the ratio of the primary filter output is large, and in the normal state, the servo-gain in the low frequency region becomes large because the ratio of the secondary filter output becomes large.

In addition, in the above described embodiments, the present invention is described in connection to a servo-control system of the drum motor 12; however, it is needless to say that the present invention can be applied an arbitrary motor control system in which the phase control is required.

Furthermore, the present invention can be applied to not only the software servo-control system utilizing the microcomputer but also a motor control system constructed by a hardware.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A motor control system for controlling a motor which outputs a speed indicative signal and a phase indicative signal, comprising:
   speed detecting means for outputting a speed error signal component on the basis of a time interval of said speed indicative signal;
   speed integration means for outputting a speed integration signal component on the basis of a difference between said speed error signal component and a first reference signal;
   phase detecting means for outputting a phase error signal component on the basis of a difference between said phase indicative signal and a phase reference signal;
   phase integration means for outputting a phase integration signal component on the basis of a difference between said phase error signal component and a second reference signal; and
   synthesizing means for synthesizing said speed error signal component, said speed integration signal component and said phase integration signal component with each other.

2. A system according to claim 1, further comprising filter means for filtering an output of said synthesizing means.

3. A system according to claim 2, further comprising acceleration detecting means for detecting an acceleration of a rotation of said motor, wherein said filter means includes synthesizing ratio changing means for changing a synthesizing ratio of filter outputs of different degrees in response to said acceleration.

4. A control method for controlling a motor outputting a speed indicative signal and a phase indicative signal, comprising the steps of:
   (a) generating a speed error signal component on the basis of a time interval of said speed indicative signal;
   (b) generating a speed integration signal component on the basis of a difference between said speed error signal component and a first reference signal;
   (c) generating a phase error signal component on the basis of a difference between said phase indicative signal and a phase reference signal;
   (d) generating a phase integration signal component on the basis of said phase error signal component and a second reference signal; and
   (e) synthesizing said speed error signal component, said speed integration signal component and said phase integration signal component.

5. A control method according to claim 4, further comprising the steps of
   (f) detecting an acceleration of a rotation of said motor, and
   (g) filtering a component synthesized in said step (e), a synthesizing ratio of filter outputs of different degrees being changed in response to said acceleration detected in said step (g).

6. A motor control system for controlling a motor outputting a speed indicative signal and a phase indicative signal, comprising:
   speed detecting means for outputting a speed error signal component on the basis of a time interval of said speed indicative signal;
   phase detecting means for outputting a phase error signal component on the basis of a difference between said phase indicative signal and a phase reference signal;
   acceleration detecting means for detecting an acceleration of a rotation of said motor; and
   synthesizing means for synthesizing said speed error signal component and said phase error signal component with different synthesizing ratios according to said acceleration.

7. A motor control system for controlling a motor outputting a speed indicative signal and a phase indicative signal, comprising;
   speed detecting means for outputting a speed error signal component on the basis of a time interval of said speed indicative signal;
   phase detecting means for outputting a phase error signal component on the basis of a difference between said phase indicative signal and phase reference signal;
   synthesizing means for synthesizing said speed error signal component and said phase error signal component with each other;
   acceleration detecting means for detecting an acceleration of a rotation of said motor; and
   filter means for filtering an output of said synthesizing means with different synthesizing ratios of filter outputs of different degrees in response to said acceleration.

* * * * *